(12) United States Patent
Adams et al.

(10) Patent No.: US 9,417,801 B2
(45) Date of Patent: Aug. 16, 2016

(54) VIRTUAL GENERAL-PURPOSE I/O CONTROLLER

(71) Applicant: Intel Corporation, Santa Clara, CA (US)

(72) Inventors: Nicholas J. Adams, Beaverton, OR (US); Robert E. Gough, Sherwood, OR (US); Sai Prasad Paithara Balagangadhara, Folsom, CA (US); Pronay Dutta, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/227,735

(22) Filed: Mar. 27, 2014

(65) Prior Publication Data

US 2015/0277778 A1    Oct. 1, 2015

(51) Int. Cl.
| | | |
|---|---|---|
| *G06F 3/00* | (2006.01) | |
| *G06F 3/06* | (2006.01) | |
| *G06F 13/24* | (2006.01) | |
| *G06F 13/38* | (2006.01) | |

(52) U.S. Cl.
CPC ............ *G06F 3/0611* (2013.01); *G06F 3/0659* (2013.01); *G06F 3/0673* (2013.01); *G06F 13/24* (2013.01); *G06F 13/385* (2013.01)

(58) Field of Classification Search
CPC .......... G06F 3/00; G06F 15/177; G06F 13/20
USPC ........................................................ 710/1, 30
See application file for complete search history.

(56) References Cited

U.S. PATENT DOCUMENTS

| | | | | |
|---|---|---|---|---|
| 5,864,705 | A * | 1/1999 | Behnke | 712/32 |
| 6,825,689 | B1 * | 11/2004 | Snyder | 326/41 |
| 7,484,027 | B1 * | 1/2009 | Dahlin | 710/305 |
| 8,078,970 | B1 * | 12/2011 | Anderson | 715/735 |
| 8,650,327 | B2 * | 2/2014 | Nie et al. | 710/3 |
| 2011/0260752 | A1 * | 10/2011 | Jouin et al. | 326/41 |
| 2013/0080677 | A1 * | 3/2013 | Simmons | 710/316 |
| 2014/0108679 | A1 * | 4/2014 | Mishra et al. | 710/30 |

* cited by examiner

*Primary Examiner* — Titus Wong
(74) *Attorney, Agent, or Firm* — Barnes & Thornburg LLP

(57) ABSTRACT

Technologies for virtual general purpose I/O (GPIO) include a computing device having a virtual GPIO controller driver, a virtual GPIO controller firmware interface, and a virtual GPIO controller. The driver receives a GPIO command from an operating system of the computing device. The GPIO command specifies an operation to be performed by a GPIO pin. The driver sends the GPIO command to the firmware interface. In response to the firmware interface receiving the command, the virtual GPIO controller emulates a virtual GPIO pin to implement the GPIO command. The firmware interface may trigger an interrupt that can be received by the operating system. The virtual GPIO controller may emulate the virtual GPIO pin using firmware-reserved backing memory, an embedded controller, or an interface to a peripheral device of the computing device. The firmware interface may be an ACPI control method. Other embodiments are described and claimed.

25 Claims, 4 Drawing Sheets

VIRTUAL GENERAL-PURPOSE I/O CONTROLLER

BACKGROUND

Typical computing devices include a number of general purpose input/output ("GPIO") pins included in the platform chipset or in the platform system-on-a-chip. GPIO pins may support reading and writing digital data, and may generate hardware interrupts for the computing device. Typically, GPIO pins are multi-purpose and may be configured by the computing device for particular applications. For example, GPIO pins may be used to drive, bit-bang, or otherwise control platform-specific features such as buttons, indicators (e.g., LEDs), switches, or sensors (e.g., lid closing sensors, docking port sensors, drive insertion sensors, etc.).

Typical computing devices include one or more hardware GPIO controllers implemented in the chipset or main processor to control the GPIO pins. Software or firmware on the computing device may interact with the hardware GPIO controller by reading from or writing to particular registers or memory addresses associated with the hardware GPIO controller. The advanced configuration and power interface (ACPI) specification provides one example of a firmware interface to hardware GPIO pins. Typically, operating systems vendors specify minimum required hardware resources, including specific hardware GPIO pins that must be included in the platform chipset.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
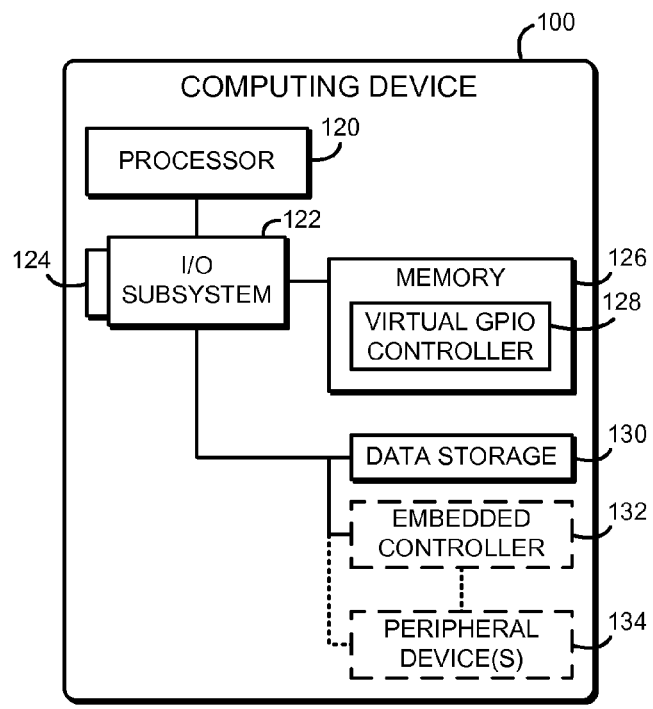
FIG. 1 is a simplified block diagram of at least one embodiment of a computing device for providing a virtual GPIO controller.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a computing device 100 establishes a virtual GPIO controller to reduce the total number of physical GIPO pins required by the computing device 100. To do so, as discussed in detail below, an operating system of the computing device 100 establishes a standard interface for GPIO controller drivers and subsequently loads a virtual GPIO controller driver. The virtual GPIO controller driver receives GPIO commands (e.g., read, write, status, or control commands) from the operating system and forwards the commands to a virtual GPIO controller firmware interface. In response to the virtual GPIO controller firmware interface receiving the GPIO command, the virtual GPIO controller emulates the behavior of one or more physical GPIO pins, and responds appropriately to the GPIO command Such emulated physical GPIO pins are referred to herein as "virtual GPIO pins."

In some embodiments, the virtual GPIO controller may, additionally or alternatively, monitor for platform events that affect the emulated state of the virtual GPIO pin. Based on the emulated state of the virtual GPIO pin, the virtual GPIO controller may cause the virtual GPIO firmware interface to assert an interrupt that is handled by the operating system. The operating system handles the interrupt by passing one or more GPIO commands to the virtual GPIO controller driver to query the state of the virtual GPIO pin and then responding accordingly. Thus, the virtual GPIO pin emulated by the virtual GPIO controller appears to the operating system to be identical to one or more physical GPIO pins. It should be understood that the virtual GPIO controller may emulate any number of virtual GPIO pins.

It should be appreciated that the computing device 100 of the present disclosure may reduce the number of dedicated, physical GPIO pins required to comply with GPIO pin requirements set by an operating system vendor. Additionally or alternatively, the computing device 100 may be able to implement required GPIO functionality using peripheral devices or embedded controllers that are typically less expensive and more easily customized than the main processor, chipset, or system-on-a-chip of the computing device 100.

The computing device 100 may be embodied as any type of device for performing the functions described herein. For example, the computing device 100 may be embodied as, without limitation, a desktop computer, a server computer, a workstation, a laptop computer, a notebook computer, a mobile computing device, a smart phone, a tablet computer, a cellular telephone, a handset, a messaging device, a wearable computing device, a vehicle telematics device, a distributed computing system, a multiprocessor system, a consumer electronic device, and/or any other computing device configured to perform the functions described herein. As shown in FIG. 1, the illustrative computing device 100 includes a processor 120, an input/output subsystem 122, a memory 126, and a data storage device 130. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The illustrative memory 126 includes a virtual GPIO controller 128. As described further below, the virtual GPIO controller 128 is a software entity that emulates, adapts, or abstracts one or more physical GPIO pins. The memory 126 is communicatively coupled to the processor 120 via the I/O subsystem 122, which may be embodied as circuitry and/or components to facilitate input/output operations with the processor 120, the memory 126, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 122 further includes a reduced-pin GPIO set 124. The reduced-pin GPIO set 124 may include a number of physical GPIO pins for use by the computing device 100. The reduced-pin GPIO set 124 includes a reduced number of physical GPIO pins compared to a typical I/O subsystem, and in some embodiments may include a single GPIO pin. In some embodiments, the I/O subsystem 122 may form a portion of a system-on-a-chip (SoC) and be incorporated, along with the processor 120, the memory 126, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The data storage device 130 may be used to store software or other data for execution including operating system software and application software.

The computing device 100 further may include an embedded controller 132 and/or a number of peripheral devices 134. The embedded controller 132 may be embodied as any microcontroller or other controller chip of the computing device 100 that is separate or independent from the processor 120 and/or the I/O subsystem 122. The embedded controller 132 may perform any secondary or ancillary computing activity for the computing device 100, such as managing communications with one or more of the peripheral devices 134. The embedded controller 132 may communicate with the I/O subsystem 122 over a data connection that requires relatively limited computing resources such as a low-pin-count (LPC) bus, or a system peripheral interconnect (SPI) bus. In addition, the embedded controller 132 may be fabricated on an older or larger semiconductor process node compared to the processor 120 or the I/O subsystem 122. Therefore, the embedded controller 132 may be relatively inexpensive to design, manufacture, or customize.

The peripheral devices 134 may be embodied as any peripheral device component of the computing device 100. For example, the peripheral devices 134 may be embodied as human input devices, displays, indicators such as light emitting diodes (LEDs), sensors such as temperature sensors or device insertion sensors, switches, or buttons. The peripheral devices 134 may provide platform-specific functionality for the computing device 100 such as determining whether a lid of the computing device 100 is closed, determining whether media has been inserted into a media drive, or responding to user interaction with hardware buttons. Each of the peripheral devices 134 may be communicatively coupled directly to the I/O subsystem 122 or to the embedded controller 132. Each peripheral device 134 may communicate using any appropriate hardware interface or communication protocol. Thus, each peripheral device 134 need not be coupled to a dedicated GPIO pin of the I/O subsystem 122.

Figure 2:
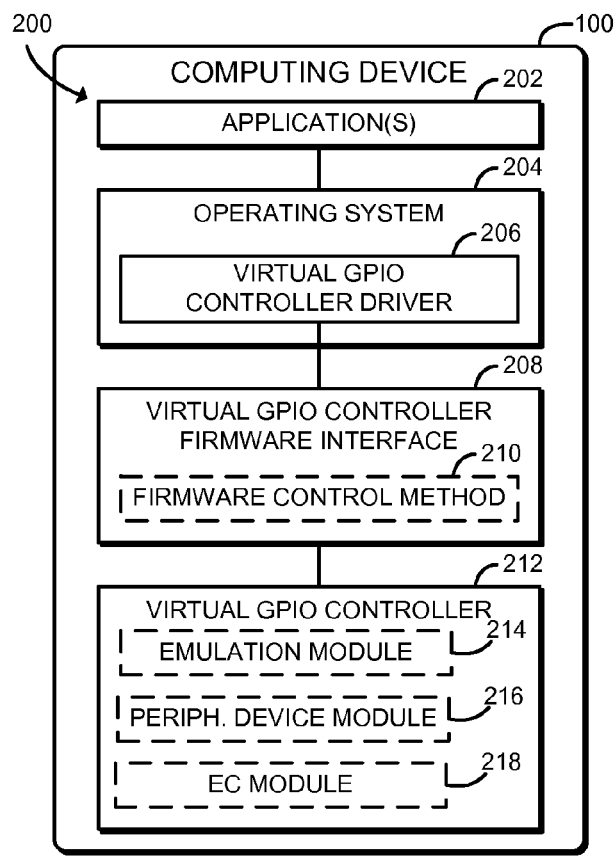
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a number of applications 202, an operating system 204 including a virtual GPIO controller driver 206, a virtual GPIO controller firmware interface 208, and a virtual GPIO controller 212. The various modules and/or components of the environment 200 may be embodied as hardware, firmware, software, or a combination thereof.

The applications 202 are configured to read, write, or otherwise access data from the virtual GPIO pin(s) emulated by the virtual GPIO controller 212, described further below. The applications 202 may provide user-level, interactive functions as well as utility or operating-system level functions such as power management or docking port management. In some embodiments, the applications 202 may include higher-level device drivers for peripheral devices 134 connected using the virtual GPIO pin. In those embodiments, the device driver may be the same device driver used in circumstances in which the peripheral devices 134 are connected to a physical GPIO pin.

The operating system 204 is configured to manage the applications 202 and control access to the virtual GPIO pin(s). The operating system 204 includes one or more standardized interfaces for device drivers. Accordingly, the operating system 204 creates and manages a number of device drivers, including the virtual GPIO controller driver 206. The operating system 204 may forward GPIO commands received from the applications 202 (including, in some embodiments, peripheral device drivers or other software/firmware) to the virtual GPIO controller driver 206. Additionally, the operating system 204 may independently generate GPIO commands and send the commands to the virtual GPIO controller driver 206. Additionally, as described above, the operating system 204 may respond to interrupts generated by the virtual GPIO controller firmware interface 208. In responding to such interrupts, the operating system 204 may send GPIO commands to the virtual GPIO controller driver 206, for example query commands to determine the source of the interrupt. The operating system 204 may send the GPIO commands to the virtual GPIO controller driver 206 using any technique, for example by invoking a number of callback functions implemented by the virtual GPIO controller driver 206.

The virtual GPIO controller driver 206 is configured to receive GPIO commands from the operating system 204 and to forward the GPIO commands to the virtual GPIO controller firmware interface 208. The virtual GPIO controller driver 206 may process or format the GPIO commands as required by the virtual GPIO controller firmware interface 208. In some embodiments, the GPIO commands may pass through the virtual GPIO controller driver 206 largely unchanged. The virtual GPIO controller driver 206 implements a standard GPIO driver interface of the operating system 204; thus, from the perspective of the operating system 204, the virtual GPIO controller driver 206 may be interchangeable with drivers for physical GPIO pins. The virtual GPIO controller driver 206 may thus be resident within the address space of the operating system 204. In some embodiments the virtual GPIO controller driver 206 and the operating system 204 may be provided by different entities; for example, the virtual GPIO controller driver 206 may be provided by the platform hardware vendor.

The virtual GPIO controller firmware interface 208 is configured to receive GPIO commands from the virtual GPIO controller driver 206. Additionally, or alternatively, the virtual GPIO controller firmware interface 208 may interrupt or otherwise signal the operating system 204 in response to GPIO events handled or generated by the virtual GPIO controller 212. The virtual GPIO controller firmware interface 208 may implement a standardized firmware interface used to communicate with physical GPIO pins. For example, in some embodiments the virtual GPIO controller firmware interface 208 may implement a firmware control method as defined by the advanced configuration and power interface (ACPI) specification. That firmware control method may be embodied as a collection of instructions for a standardized virtual machine architecture (i.e., "bytecode") that may be interpreted by the computing device 100. In some embodiments, those functions may be performed by a sub-module, for example by the firmware control method 210.

The virtual GPIO controller 212 is configured to emulate one or more virtual GPIO pin(s) to implement the GPIO command received by the virtual GPIO controller firmware interface 208. Additionally or alternatively, the virtual GPIO controller 212 is configured to receive and implement GPIO events related to the state of the virtual GPIO pin(s). For example, a GPIO event may correspond to a change in the value of an emulated virtual GPIO pin based on a software event of the computing device 100. As another example, a GPIO event may correspond to a change in the value of the emulated virtual GPIO pin based on the state of a peripheral device 134 and/or an embedded controller 132. The virtual GPIO controller 212 may emulate the virtual GPIO pin(s) using any supporting resources of the computing device 100. For example, the virtual GPIO controller 212 may emulate the virtual GPIO pin(s) in software, in some embodiments using a reserved segment of the memory 126 to store data relating to the state of the virtual GPIO pin(s). Additionally or alternatively, the virtual GPIO controller 212 may emulate the virtual GPIO pin(s) by adapting the behavior of one or more peripheral devices 134. In some embodiments, the virtual GPIO controller 212 may emulate the virtual GPIO pin(s) by adapting the behavior of one or more embedded controllers 132, for example by adapting a resource (e.g. an I/O pin or bus) of an embedded controller 132 to appear as a GPIO pin, or by multiplexing a resource of an embedded controller 132 to appear as several independent GPIO pins. The virtual GPIO controller 212 may be embodied as any combination of application code, operating system driver code, or firmware code of the computing device 100. In some embodiments, those functions may be performed by one or more sub-modules, for example by an emulation module 214, a peripheral device module 216, or an embedded controller module 218. Although illustrated as separate modules, in some embodiments the virtual GPIO controller 212 may be included in or otherwise combined with the virtual GPIO controller firmware interface 208 and/or the firmware control method 210.

Figure 3:
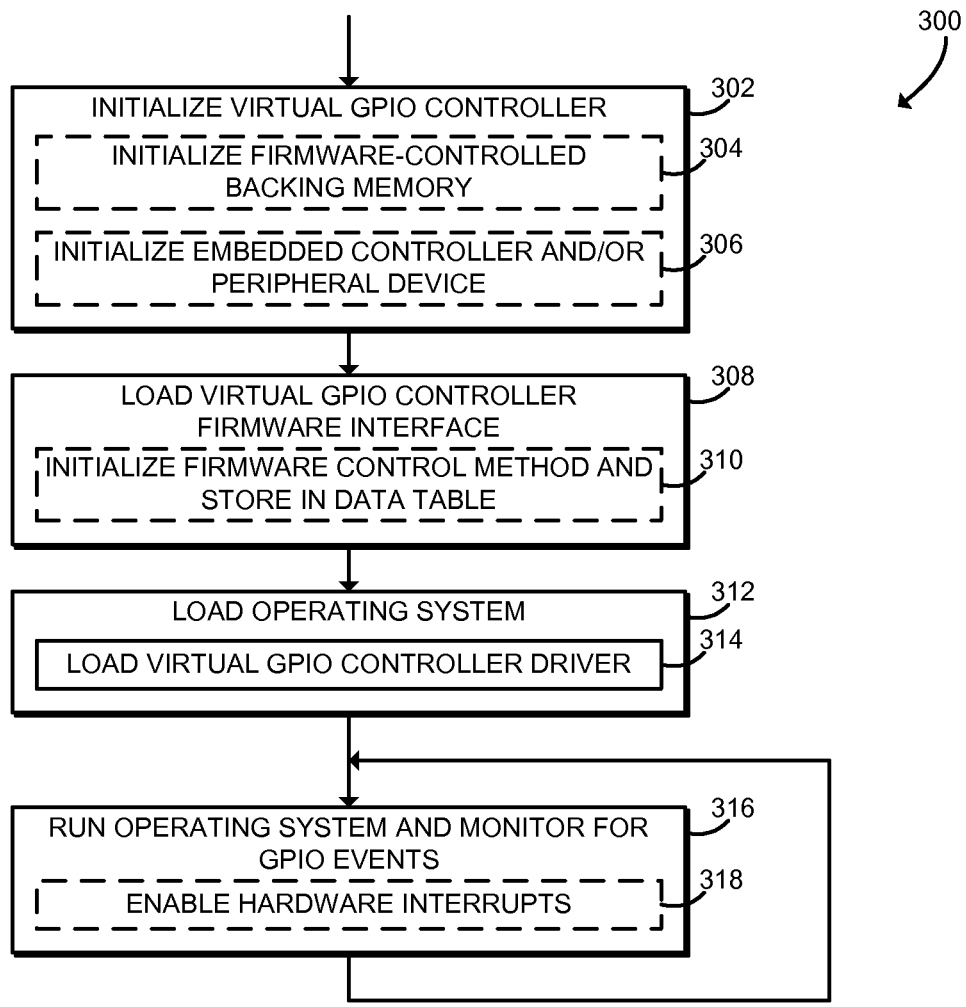
FIG. 3 is a simplified flow diagram of at least one embodiment of a method for initializing and running a virtual GPIO controller that may be executed by the computing device of FIGS. 1 and 2.

Referring now to FIG. 3, in use, the computing device 100 may execute a method 300 for initializing and emulating a virtual GPIO pin. The method 300 begins in block 302, in which the computing device 100 initializes the virtual GPIO controller 212. The computing device 100 may perform any initialization necessary for the virtual GPIO controller 212 to emulate a virtual GPIO pin, including initializing any required data structures or communications links. In some embodiments, in block 304 the computing device 100 may initialize a region of firmware-controlled backing memory for the virtual GPIO pin. The backing memory may be embodied as a segment of the main memory 126 reserved by firmware and thus unavailable for use by the operating system 204 and/or the applications 202. The backing memory may be used by the virtual GPIO controller 212 to store state of the virtual GPIO pin, for example registers containing values associated with the virtual GPIO pin and registers containing values to control behavior of the virtual GPIO pin. In some embodiments, in block 306 the computing device 100 may initialize an embedded controller 132 and/or a peripheral device 134. The computing device 100 may perform any initialization required, for example sending reset signals or initialization commands.

In block 308, the computing device 100 loads the virtual GPIO controller firmware interface 208. The computing device 100 may load the virtual GPIO controller firmware interface 208 using any technique compatible with the operating system 204. In some embodiments, in block 310 the computing device 100 may initialize a firmware control method 210 and store the firmware control method 210 in a system data table. The firmware control method 210 may be embodied as any firmware routine capable of managing communications between the operating system 204 and the virtual GPIO controller 212. For example, the firmware control method 210 may be embodied as a control method as defined by the ACPI specification. An ACPI control method may be embodied as a set of declarations and/or instructions written in the ACPI source language (ASL) that is compiled into ACPI machine language (AML). AML may be embodied as a collection of bytecode that may be interpreted by the operating system 204. The AML for the firmware control method 210 may be loaded into one or more ACPI tables stored in the memory 126. At runtime, the operating system 204 may access the firmware control method 210 by looking up the appropriate AML stored in the ACPI tables. The computing device 100 may interpret the AML of the firmware control method 210 in order to perform the functions of the virtual GPIO controller firmware interface 208. Although illustrated as a single firmware control method 210, in some embodiments the virtual GPIO controller firmware interface 208 may include any number of firmware control methods 210. For example, the virtual GPIO controller firmware interface 208 may be embodied as an ACPI device including a number of ACPI control methods.

In block 312, the computing device 100 loads the operating system 204. The computing device 100 may execute a firmware boot loader that passes control to the operating system 204. During or after the operating system 204 is loaded, in block 314 the computing device 100 loads the virtual GPIO controller driver 206. For example, in some embodiments, the operating system 204 may load the virtual GPIO controller driver 206 upon enumerating a virtual GPIO controller device defined by the platform firmware. Loading the virtual GPIO controller driver 206 allows the operating system 204 to communicate to the virtual GPIO controller firmware interface 208 and therefore interact with the virtual GPIO pin. In some embodiments, the computing device 100 may reference one or more system data tables to select the virtual GPIO controller driver 206 appropriate for the loaded virtual GPIO controller firmware interface 208.

In block 316, the computing device 100 runs the operating system 204 (including any applications 202 executed by the operating system 204) and monitors for GPIO events. GPIO events may include events caused by the operating system 204, including GPIO events requested by one or more applications 202. GPIO events may also include events caused by the virtual GPIO controller 212, including software-originated events or events originating from an embedded controller 132 and/or a peripheral device 134. GPIO events may also include interrupts triggered by the virtual GPIO controller firmware interface 208. Methods for processing GPIO events are described in detail below in connection with FIGS. 4 and 5. In some embodiments, in block 318, the computing device 100 may enable hardware interrupts of the processor 120 and/or the I/O subsystem 122. Among other things, the virtual GPIO controller firmware interface 208 may signal events to the operating system 204 using a single hardware interrupt line. Additionally, in some embodiments, the virtual GPIO controller 212 may monitor hardware interrupts to manage events from the embedded controllers 132 and/or peripheral devices 134. The method 300 loops back to block 316 to continue running the operating system 204 and monitoring for GPIO events.

Figure 4:
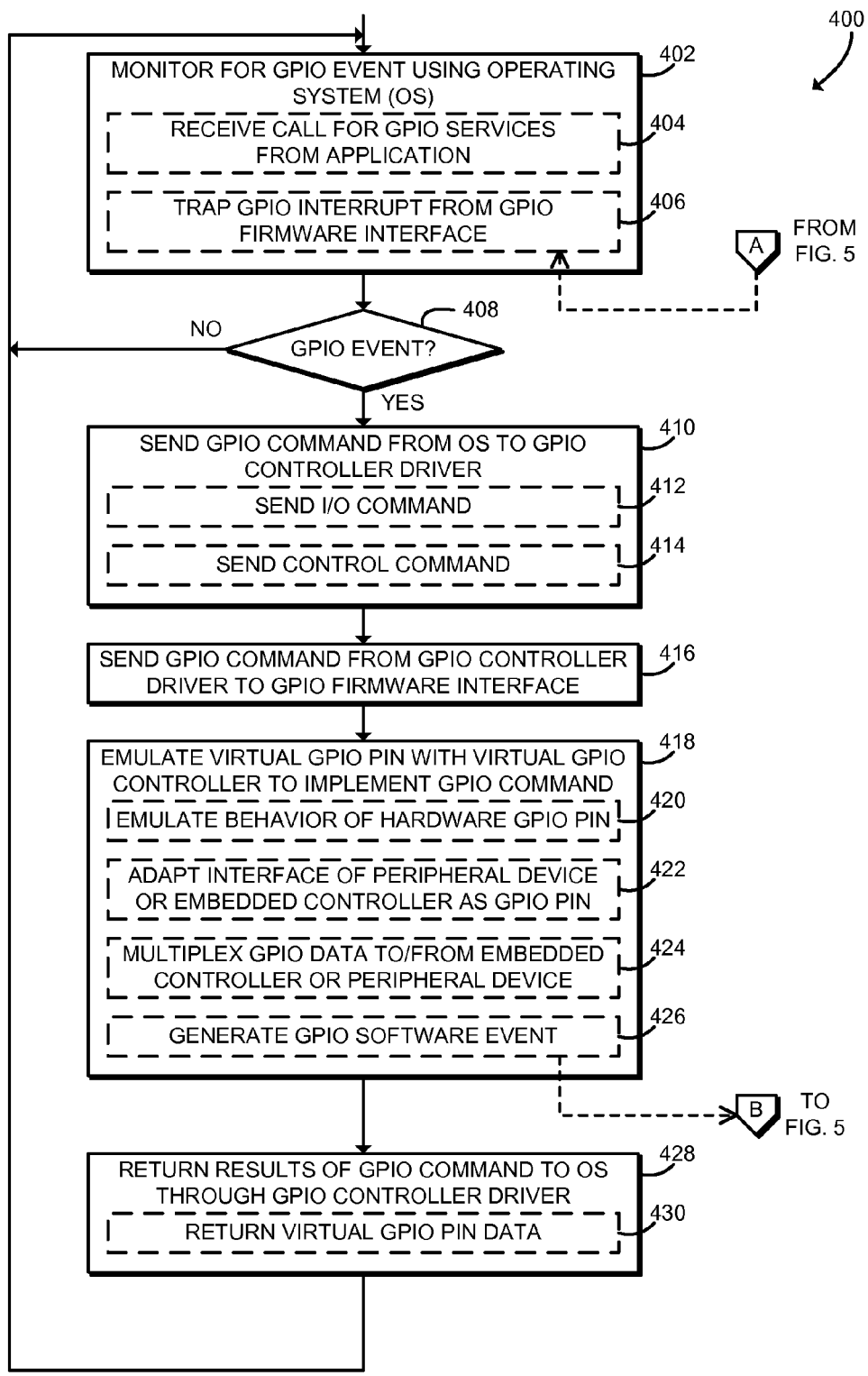
FIG. 4 is a simplified flow diagram of at least one embodiment of a method for monitoring and handling GPIO commands that may be executed by the computing device of FIGS. 1 and 2.

Referring now to FIG. 4, in use, the computing device 100 may execute a method 400 for monitoring and responding to GPIO events received by the operating system 204. The method 400 begins with block 402, in which the computing device 100 monitors for a GPIO event using the operating system 204. A GPIO event may be embodied as any platform event relating to the state of the virtual GPIO pin. GPIO events include GPIO commands such as read, write, or control commands, as well as interrupts or other asynchronous events related to the state of the virtual GPIO pin. In some embodiments, in block 404 the computing device 100 may receive a call for GPIO services from an application 202. The operating system 204 may implement a standardized application programming interface (API) to receive calls for GPIO services from the applications 202. The call for service typically may be mapped onto one or more GPIO commands, including I/O commands and control commands (described further below with respect to block 410). In some embodiments, in block 406 the computing device 100 may trap a GPIO interrupt received from the virtual GPIO controller firmware interface 208. The interrupt may be generated based on the state of the virtual GPIO pin, for example based on a state change from emulation, or a state change of an underlying peripheral device 134 and/or embedded controller 132. The interrupt may be signaled using any method available to firmware on the computing device 100. For example, the interrupt may be generated as a system control interrupt (SCI) as defined by the ACPI specification. Generation of GPIO interrupts is described further with respect to method 500 of FIG. 5.

In block 408, the computing device 100 determines whether a GPIO event has been received. If not, the method 400 loops back to block 402 to continue monitoring for GPIO events. If a GPIO event has been received, the method 400 advances to block 410.

In block 410, the computing device 100 sends a GPIO command from the operating system 204 to the virtual GPIO controller driver 206. The GPIO command specifies an operation to be performed by a GPIO pin. Although the GPIO command will ultimately be implemented by a virtual GPIO pin, the same interface is used by the operating system 204 for both physical and virtual GPIO pins. Thus, the operating system 204 and the driver interface of the operating system 204 may be identical for physical and virtual GPIO pins. As described above, the GPIO command may be in response to a request for services from an application 202 or may be created to service an interrupt received from the virtual GPIO controller firmware interface 208. The computing device 100 may use any method to send the command to the virtual GPIO controller driver 206. For example, the operating system 204 may call one or more callback functions defined by the virtual GPIO controller driver 206. Those callback functions may be part of a well-known driver interface for GPIO controllers. Thus, the operating system 204 interacts with the virtual GPIO controller driver 206 in the same manner as for hardware GPIO drivers.

In some embodiments, in block 412 the computing device 100 may send an I/O command to the virtual GPIO controller driver 206. I/O commands may include commands to read or write data from the virtual GPIO pin. In some embodiments, in block 414 the computing device 100 may send a control command to the virtual GPIO controller driver 206. The control command may include commands to adjust the behavior of the virtual GPIO pin or to query the status of the virtual GPIO pin. Control commands may include commands to enable or disable interrupts on the virtual GPIO pin, adjust the logical level of the virtual GPIO pin, adjust the drive current of the virtual GPIO pin, or other control commands. For example, the operating system 204 may send control commands to determine the virtual GPIO pin or pins that caused a GPIO interrupt.

In block 416, the computing device 100 sends the GPIO command from the virtual GPIO controller driver 206 to the virtual GPIO controller firmware interface 208. The computing device 100 may use any technique to invoke the virtual GPIO controller firmware interface 208. For example, the computing device 100 may select a firmware control method 210 from a system data table and execute that control method.

In some embodiments, the firmware control method 210 may be executed using an appropriate bytecode interpreter.

In block 418, the computing device 100 emulates the virtual GPIO pin using the virtual GPIO controller 212 to implement the GPIO command. The computing device 100 may use any technique to virtualize, abstract, or otherwise emulate behavior of the virtual GPIO pin. Of course, it should be understood that in some embodiments the virtual GPIO controller firmware interface 208 and the virtual GPIO controller 212 may both be implemented in firmware or in the same firmware control method 210. In some embodiments, in block 420 the computing device 100 may emulate the behavior of a hardware GPIO pin. For example, the computing device 100 may respond to a read or a write command by reading or writing a value stored in backing memory associated with that particular virtual GPIO pin. In some embodiments, the backing memory may be embodied as a segment of memory 126 reserved for use by firmware and thus isolated from the operating system 204. The computing device 100 may thus persist the value assigned to the virtual GPIO pin; that is, the computing device 100 may maintain the value associated with the virtual GPIO pin for at least some reference time period. Additionally or alternatively, the computing device 100 may emulate the behavior of a hardware GPIO pin using a software model, invoking a device driver or application, or other emulation technique.

In some embodiments, in block 422 the computing device 100 may adapt the interface of a peripheral device 134 or an embedded controller 132 as the virtual GPIO pin. In other words, the computing device 100 may emulate the virtual GPIO pin using a peripheral device 134 or an embedded controller 132. Adapting the interface of a peripheral device 134 may cause the peripheral device 134 to appear to the operating system 204 to be connected to the computing device 100 via one or more hardware GPIO pins. In particular, the computing device 100 may adapt the particular hardware or software interface used to control the peripheral device 134. For example, the computing device 100 may translate GPIO commands (e.g., read, write, status, and events) into a hardware interface used by a particular peripheral device 134. Adapting an embedded controller 132 may cause one or more inputs or outputs of the embedded controller 132 to appear to the operating system 204 as hardware GPIO pins. Those inputs or outputs may be embodied as physical GPIO pins on the embedded controller 132. For example, the computing device 100 may forward GPIO commands to and from the embedded controller 132 over the appropriate interconnect bus, and the embedded controller 132 may perform I/O operations with its own I/O resources (e.g., GPIO pins or other hardware interfaces). In some embodiments, the embedded controller 132 may thus interface with one or more peripheral devices 134.

In some embodiments, in block 424 the computing device 100 may multiplex GPIO data to or from an embedded controller 132 and/or peripheral device 134. For example, a single embedded controller 132 may include a number of hardware I/O connections to peripheral devices 134, but may be connected to the I/O subsystem 122 using a single bus, pin, or interrupt. The virtual GPIO controller 212—or additional virtual GPIO controllers 212 of the computing device 100—may emulate more than one virtual GPIO pin. The virtual GPIO controller 212 may package, identify, or otherwise multiplex GPIO commands relating to each virtual GPIO pin so that the embedded controller 132 may perform the appropriate operation on each hardware I/O connection. For example, the embedded controller 132 may include a number of hardware GPIO pins, and the virtual GPIO controller 212 may emulate a virtual GPIO pin for each of those hardware GPIO pins. Similarly, in some embodiments the computing device 100 may multiplex GPIO data for several virtual GPIO pins associated with a number of peripheral devices 134 sharing the same hardware connection. As described above, multiplexing may reduce the number of physical pins on the processor 120 and/or the I/O subsystem 122 that are needed to support the peripheral devices 134.

In some embodiments, in block 426 the computing device 100 may generate a GPIO event in response to the emulation of the virtual GPIO pin. For example, software emulation may determine that a GPIO event should be generated based on the new state of the virtual GPIO pin. As another example, the computing device 100 may determine that a GPIO event should be generated based on interaction with an embedded controller 132 and/or a peripheral device 134. A GPIO event generated by the virtual GPIO controller 212 may be processed by the method 500 of FIG. 5, described below.

In block 428, the computing device 100 returns the results of the GPIO command to the operating system 204 via the virtual GPIO controller driver 206. For example, the virtual GPIO controller driver 206 may return the results from a callback method previously called by the operating system 204. The returned results may include status codes or other information describing the success of the GPIO event. In some embodiments, in block 430 the computing device 100 may return virtual GPIO data to the operating system 204, for example in response to a read command. For example, the virtual GPIO data may represent a virtual input value associated with the virtual GPIO pin. The operating system 204 may, in turn, use the returned GPIO data respond to an application 202, service an interrupt, or otherwise process the GPIO event. After returning results, the method 400 loops back to block 402 to continue monitoring for GPIO events.

Figure 5:
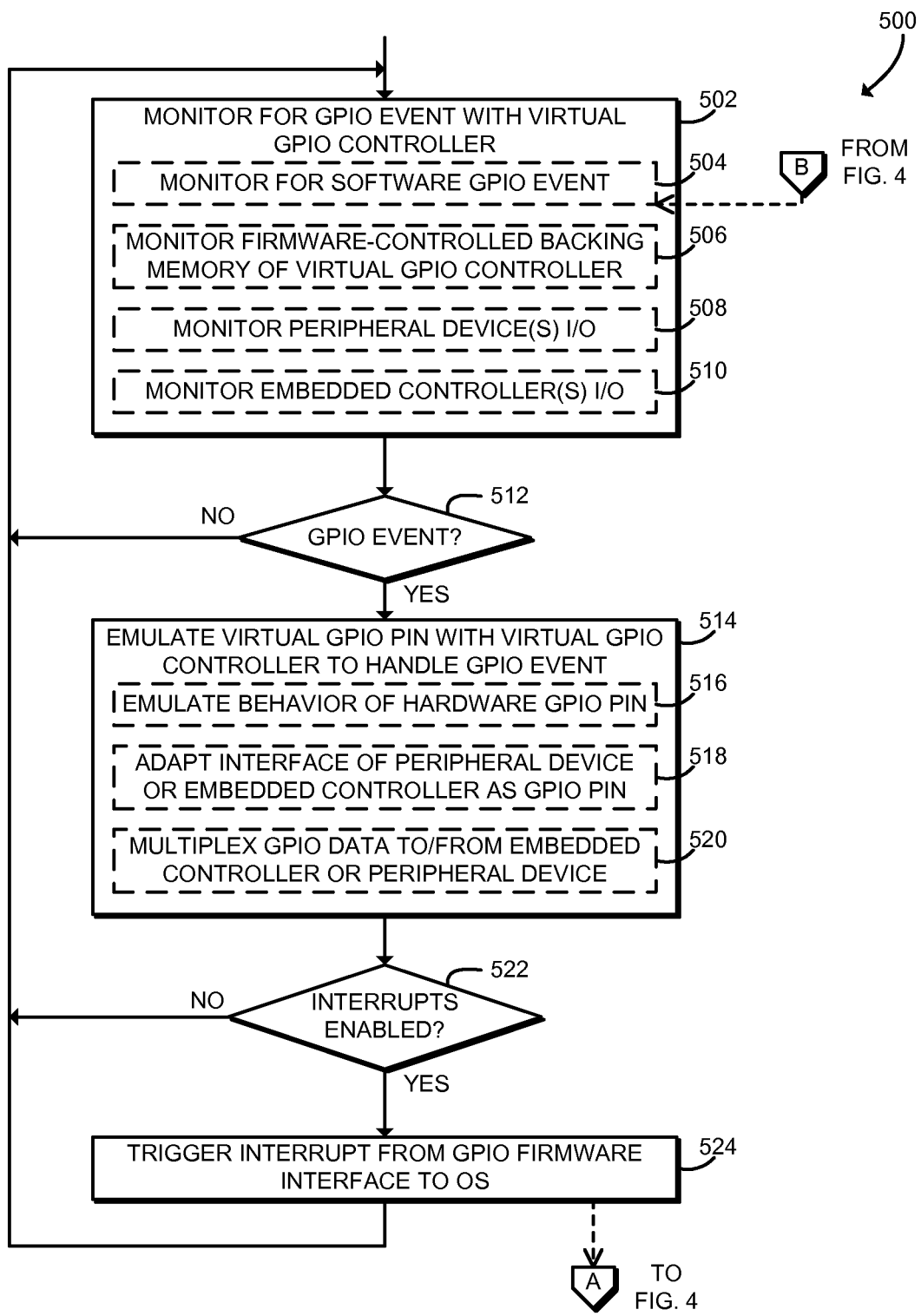
FIG. 5 is a simplified flow diagram of at least one embodiment of a method for monitoring and handling GPIO events that may be executed by the computing device of FIGS. 1 and 2.

Referring now to FIG. 5, in use, the computing device 100 may execute a method 500 for monitoring and responding to GPIO events received by the virtual GPIO controller 212. The method 500 begins in block 502, in which the computing device 100 monitors for a GPIO event using the virtual GPIO controller 212. The virtual GPIO controller 212 may monitor for any platform event affecting the state of the virtual GPIO pin, including software events, hardware events, interrupts, network events, or any other event affecting the emulated virtual GPIO pin. In block 504, the computing device 100 monitors for a software GPIO event. That GPIO event may be generated in software or firmware by the virtual GPIO controller 212 itself, for example, in response to a GPIO command received from the virtual GPIO controller driver 206. Generation of software GPIO events is described further above in relation to block 426 of FIG. 4. In some embodiments, in block 506 the computing device 100 may monitor the firmware-controlled backing memory of the virtual GPIO controller 212. The computing device 100 may determine whether any values in the backing memory have changed, for example if a platform event has written data to the backing memory. In some embodiments, in block 508 the computing device 100 may monitor for I/O with a peripheral device 134. The computing device 100 may determine if data has been sent or received to the peripheral device 134, if the peripheral device 134 has triggered an interrupt, if the peripheral device 134 has data ready to be transmitted, or if any other I/O operation with the peripheral device 134 is pending. Similarly, in some embodiments in block 510 the computing device 100 may monitor for I/O with an embedded controller 132.

In block 512, the computing device 100 determines whether a GPIO event has been received. If not, the method 500 loops back to block 502 to continue monitoring for GPIO events. If a GPIO event was received, the method 500 advances to block 514.

In block 514, the computing device 100 emulates the virtual GPIO pin using the virtual GPIO controller 212 to handle the GPIO event. In particular, the emulated state of the virtual GPIO pin may be modified in response to handling the GPIO event. The computing device 100 may use any technique to virtualize, abstract, adapt, or otherwise emulate behavior of the virtual GPIO pin. Of course, it should be understood that in some embodiments the virtual GPIO controller firmware interface 208 and the virtual GPIO controller 212 may both be implemented in firmware or in the same firmware control method 210. In some embodiments, in block 516 the computing device 100 may emulate the behavior of a hardware GPIO pin. For example, the computing device 100 may determine a virtual input value associated with the virtual GPIO pin or a virtual output value associated with the virtual GPIO pin. In some embodiments, the emulated state of the virtual GPIO pin may be stored in firmware-controlled backing memory, as described above. Additionally or alternatively, the computing device 100 may emulate the behavior of a hardware GPIO pin using a software model, invoking a device driver or application, or using any other emulation technique.

In some embodiments, in block 518 the computing device 100 may adapt the interface of a peripheral device 134 or an embedded controller 132 as the virtual GPIO pin. Adapting the interface of a peripheral device 134 may cause the peripheral device 134 to appear to the operating system 204 as connected to the computing device 100 via one or more hardware GPIO pins. In particular, the computing device 100 may adapt the particular hardware or software interface used to control the peripheral device 134. For example, the computing device 100 may interpret I/O events received from a particular peripheral device 134 (e.g., input, output, or interrupts) to modify the emulated state of the virtual GPIO pin. Adapting an embedded controller 132 may modify the state of the virtual GPIO pin based on the state of one or more inputs or outputs of the embedded controller 132. Those inputs or outputs may be embodied as physical GPIO pins on the embedded controller 132. In some embodiments, the embedded controller 132 may thus interface with one or more peripheral devices 134.

In some embodiments, in block 520 the computing device 100 may multiplex GPIO data to or from an embedded controller 132 and/or peripheral device 134. For example, a single embedded controller 132 may include a number of hardware I/O connections to peripheral devices 134, but may be connected to the I/O subsystem 122 using a single bus, pin, or interrupt. The virtual GPIO controller 212—or additional virtual GPIO controllers 212 of the computing device 100—may emulate more than one virtual GPIO pin. The virtual GPIO controller 212 may package, identify, or otherwise multiplex I/O events received from the embedded controller 132 on to a number of virtual GPIO pins. For example, the embedded controller 132 may include a number of hardware GPIO pins, and the virtual GPIO controller 212 may emulate a virtual GPIO pin for each of those hardware GPIO pins. Similarly, in some embodiments the computing device 100 may multiplex GPIO data for several virtual GPIO pins associated with a number of peripheral devices 134 sharing the same hardware connection. As described above, multiplexing may reduce the number of physical pins on the processor 120 and/or the I/O subsystem 122 that are needed to support the peripheral devices 134.

After handling the GPIO event, in block 522 the computing device 100 determines whether interrupts have been enabled for the GPIO event. Interrupts may have been previously enabled by control commands received from the virtual GPIO controller driver 206 or the virtual GPIO controller firmware interface 208. Interrupts may be enabled for individual virtual GPIO pins. Thus, the computing device 100 may determine whether the virtual GPIO data related to enabled virtual GPIO pins has changed. Additionally or alternatively, the computing device 100 may determine whether an interrupt is appropriate for the GPIO event. For example, an interrupt may be appropriate when the state of a virtual GPIO pin has changed. If interrupts are not enabled, the method 500 loops back to block 502 to continue monitoring for GPIO events. As described above, the operating system 204 may read GPIO data synchronously at a later time by sending appropriate GPIO commands. If interrupts are enabled, the method 500 advances to block 524.

In block 524, the computing device 100 triggers an interrupt from the virtual GPIO controller firmware interface 208 to the operating system 204. The virtual GPIO controller 212 may invoke the virtual GPIO controller firmware interface 208 to generate the interrupt. The interrupt may be embodied as a physical interrupt generated by the I/O subsystem 122, which, as described above, may be embodied as a discrete chip or included in a system-on-a-chip (SoC) of the computing device 100. The interrupt may be handled by the operating system 204, which in turn may call appropriate functions of the virtual GPIO controller driver 206 to service the interrupt. Handling of a firmware interrupt is described further above in connection with block 406 of FIG. 4. The interrupt may be triggered using any appropriate technique compatible with the operating system 204. For example, the interrupt may be embodied as a system control interrupt (SCI) as defined by the ACPI specification. After triggering the interrupt, the method 500 loops back to block 502 to continue monitoring for GPIO events.

Although the methods 400, 500 have been described as synchronously monitoring for GPIO events, it should be understood that in some embodiments the methods 400, 500 may be event-driven or asynchronous. Further the methods 400, 500 may execute contemporaneously on the computing device 100 with each other, with the operating system 204, and with any applications 202 of the computing device 100.

EXAMPLES

Illustrative examples of the technologies disclosed herein are provided below. An embodiment of the technologies may include any one or more, and any combination of, the examples described below.

Example 1 includes a computing device for emulating general purpose I/O (GPIO), the computing device comprising a virtual GPIO controller driver, a virtual GPIO controller firmware interface, and a virtual GPIO controller, wherein the virtual GPIO controller driver is to (i) receive a GPIO command from an operating system of the computing device, the GPIO command to specify an operation to be implemented by a GPIO pin, and (ii) send the GPIO command to the virtual GPIO controller firmware interface in response to receipt of the GPIO command; the virtual GPIO firmware interface is to receive the GPIO command from the virtual GPIO controller driver; and the virtual GPIO controller is to emulate a virtual GPIO pin to implement the GPIO command in response to receipt of the GPIO command by the virtual GPIO controller firmware interface from the virtual GPIO controller driver.

Example 2 includes the subject matter of Example 1, and wherein the GPIO command comprises a read command; to emulate the virtual GPIO pin to implement the GPIO command comprises to determine a virtual input value of the virtual GPIO pin; and the virtual GPIO controller driver is further to return the virtual input value to the operating system in response to emulation of the virtual GPIO pin.

Example 3 includes the subject matter of any of Examples 1 and 2, and wherein the GPIO command comprises a write command; and to emulate the virtual GPIO pin to implement the GPIO command comprises to determine a virtual output value of the virtual GPIO pin and to maintain the virtual output value on the virtual GPIO pin for a reference time period.

Example 4 includes the subject matter of any of Examples 1-3, and wherein the GPIO command comprises a control command; and to emulate the virtual GPIO pin to implement the GPIO command comprises to modify a state of the virtual GPIO pin as a function of the control command.

Example 5 includes the subject matter of any of Examples 1-4, and wherein the virtual GPIO controller driver is further to (i) receive a second GPIO command the second GPIO command to specify an operation to be implemented by a second GPIO pin, and (ii) send the second GPIO command to the virtual GPIO controller firmware interface; the virtual GPIO controller firmware interface is further to receive the second GPIO command from the virtual GPIO controller driver; and the virtual GPIO controller is further to emulate a second virtual GPIO pin to implement the second GPIO command in response to receipt of the second GPIO command by the virtual GPIO controller firmware interface from the virtual GPIO controller driver.

Example 6 includes the subject matter of any of Examples 1-5, and wherein to emulate the virtual GPIO pin comprises to emulate the virtual GPIO pin using a microcontroller of the computing device as the virtual GPIO pin.

Example 7 includes the subject matter of any of Examples 1-6, and wherein the microcontroller comprises an embedded controller of the computing device.

Example 8 includes the subject matter of any of Examples 1-7, and wherein to emulate the virtual GPIO pin further comprises to emulate the virtual GPIO pin using a physical GPIO pin of the embedded controller as the virtual GPIO pin.

Example 9 includes the subject matter of any of Examples 1-8, and wherein the virtual GPIO controller is further to emulate a second virtual GPIO pin using the embedded controller of the computing device as the second virtual GPIO pin.

Example 10 includes the subject matter of any of Examples 1-9, and wherein to emulate the virtual GPIO pin comprises to emulate the virtual GPIO pin using an interface to a peripheral device of the computing device as the virtual GPIO pin.

Example 11 includes the subject matter of any of Examples 1-10, and wherein the virtual GPIO controller is further to reserve a memory segment for use by the virtual GPIO controller; and to emulate the virtual GPIO pin comprises to emulate the virtual GPIO pin using the reserved memory segment as backing memory.

Example 12 includes the subject matter of any of Examples 1-11, and wherein the virtual GPIO controller is further to receive a GPIO event, the GPIO event related to a state of the virtual GPIO pin; and emulate the virtual GPIO pin to modify the state of the virtual GPIO pin as a function of the GPIO event.

Example 13 includes the subject matter of any of Examples 1-12, and wherein the GPIO event comprises an I/O event received from a microcontroller of the computing device; and to emulate the virtual GPIO pin comprises to modify the state of the virtual GPIO pin as a function of the I/O event.

Example 14 includes the subject matter of any of Examples 1-13, and wherein the microcontroller comprises an embedded controller of the computing device.

Example 15 includes the subject matter of any of Examples 1-14, and wherein the virtual GPIO controller is further to emulate a second virtual GPIO pin using the embedded controller of the computing device as the second virtual GPIO pin.

Example 16 includes the subject matter of any of Examples 1-15, and wherein the GPIO event comprises an I/O event received from a peripheral device of the computing device; and to emulate the virtual GPIO pin comprises to modify the state of the virtual GPIO pin as a function of the I/O event.

Example 17 includes the subject matter of any of Examples 1-16, and wherein the virtual GPIO controller is further to reserve a memory segment for use by the virtual GPIO controller; to receive the GPIO event comprises to detect a memory access to the reserved memory segment; and to emulate the virtual GPIO pin comprises to emulate the virtual GPIO pin using the reserved memory segment as backing memory.

Example 18 includes the subject matter of any of Examples 1-17, and wherein the virtual GPIO controller firmware interface is further to trigger a physical interrupt by an I/O subsystem of the computing device to the operating system in response to a modification of the state of the virtual GPIO pin.

Example 19 includes the subject matter of any of Examples 1-18, and wherein the interrupt is to cause the operating system to send the GPIO command to the virtual GPIO controller driver.

Example 20 includes the subject matter of any of Examples 1-19, and wherein to receive the GPIO command by the virtual GPIO controller driver comprises to receive a callback method from the operating system.

Example 21 includes the subject matter of any of Examples 1-20, and wherein the virtual GPIO controller firmware interface comprises a control method for a virtual machine, the control method to be interpreted by a bytecode interpreter of the computing device.

Example 22 includes the subject matter of any of Examples 1-21, and wherein the virtual GPIO controller firmware interface comprises an advanced configuration and power interface (ACPI) device that includes a plurality of ACPI control methods.

Example 23 includes a method for emulating general purpose I/O (GPIO) on a computing device, the method comprising receiving a GPIO command by a virtual GPIO controller driver of an operating system of the computing device, the GPIO command to specify an operation to be implemented by a GPIO pin; sending the GPIO command from the virtual GPIO controller driver to a virtual GPIO controller firmware interface of the computing device in response to receiving the GPIO command; receiving the GPIO command by the virtual GPIO controller firmware interface from the virtual GPIO controller driver; and emulating, by a virtual GPIO controller of the computing device, a virtual GPIO pin to implement the GPIO command in response to receiving the GPIO command by the virtual GPIO controller firmware interface from the virtual GPIO controller driver.

Example 24 includes the subject matter of Example 23, and wherein receiving the GPIO command comprises receiving a read command; emulating the virtual GPIO pin to implement the GPIO command comprises determining a virtual input value of the virtual GPIO pin; and the method further comprises returning the virtual input value from the virtual GPIO controller driver to the operating system in response to emulating the virtual GPIO pin.

Example 25 includes the subject matter of any of Examples 23 and 24, and wherein receiving the GPIO command comprises receiving a write command; and emulating the virtual GPIO pin to implement the GPIO command comprises determining a virtual output value of the virtual GPIO pin and maintaining the virtual output value on the virtual GPIO pin for a reference time period.

Example 26 includes the subject matter of any of Examples 23-25, and wherein receiving the GPIO command comprises receiving a control command; and emulating the virtual GPIO pin to implement the GPIO command comprises modifying a state of the virtual GPIO pin as a function of the control command.

Example 27 includes the subject matter of any of Examples 23-26, and further including receiving a second GPIO command by the virtual GPIO controller driver, the second GPIO command to specify an operation to be implemented by a second GPIO pin; sending the second GPIO command from the virtual GPIO controller driver to the virtual GPIO controller firmware interface; receiving the second GPIO command by the virtual GPIO controller firmware interface from the virtual GPIO controller driver; and emulating, by the virtual GPIO controller of the computing device, a second virtual GPIO pin to implement the second GPIO command in response to receiving the second GPIO command by the virtual GPIO controller firmware interface from the virtual GPIO controller driver.

Example 28 includes the subject matter of any of Examples 23-27, and wherein emulating the virtual GPIO pin comprises emulating the virtual GPIO pin using a microcontroller of the computing device as the virtual GPIO pin.

Example 29 includes the subject matter of any of Examples 23-28, and wherein emulating the virtual GPIO pin using the microcontroller comprises emulating the virtual GPIO pin using an embedded controller of the computing device as the virtual GPIO pin.

Example 30 includes the subject matter of any of Examples 23-29, and wherein emulating the virtual GPIO pin further comprises emulating the virtual GPIO pin using a physical GPIO pin of the embedded controller as the virtual GPIO pin.

Example 31 includes the subject matter of any of Examples 23-30, and further including emulating, by the virtual GPIO controller of the computing device, a second virtual GPIO pin using the embedded controller of the computing device as the second virtual GPIO pin.

Example 32 includes the subject matter of any of Examples 23-31, and wherein emulating the virtual GPIO pin comprises emulating the virtual GPIO pin using an interface to a peripheral device of the computing device as the virtual GPIO pin.

Example 33 includes the subject matter of any of Examples 23-32, and further including reserving a memory segment for use by the virtual GPIO controller; wherein emulating the virtual GPIO pin comprises emulating the virtual GPIO pin using the reserved memory segment as backing memory.

Example 34 includes the subject matter of any of Examples 23-33, and further including receiving a GPIO event by the virtual GPIO controller, the GPIO event related to a state of the virtual GPIO pin; and emulating, by the virtual GPIO controller, the virtual GPIO pin to modify the state of the virtual GPIO pin as a function of the GPIO event.

Example 35 includes the subject matter of any of Examples 23-34, and wherein receiving the GPIO event comprises receiving an I/O event from a microcontroller of the computing device; and emulating the virtual GPIO pin comprises modifying the state of the virtual GPIO pin as a function of the I/O event.

Example 36 includes the subject matter of any of Examples 23-35, and wherein receiving the I/O event comprises receiving an I/O event from an embedded controller of the computing device.

Example 37 includes the subject matter of any of Examples 23-36, and further including emulating, by the virtual GPIO controller, a second virtual GPIO pin using the embedded controller of the computing device as the second virtual GPIO pin.

Example 38 includes the subject matter of any of Examples 23-37, and wherein receiving the GPIO event comprises receiving an I/O event from a peripheral device of the computing device; and emulating the virtual GPIO pin comprises modifying the state of the virtual GPIO pin as a function of the I/O event.

Example 39 includes the subject matter of any of Examples 23-38, and further including reserving a memory segment for use by the virtual GPIO controller; wherein receiving the GPIO event comprises detecting a memory access to the reserved memory segment; and wherein emulating the virtual GPIO pin comprises emulating the virtual GPIO pin using the reserved memory segment as backing memory.

Example 40 includes the subject matter of any of Examples 23-39, and further including triggering, by the virtual GPIO controller firmware interface, a physical interrupt by an I/O subsystem of the computing device to the operating system in response to modifying the state of the virtual GPIO pin.

Example 41 includes the subject matter of any of Examples 23-40, and wherein the interrupt is to cause the operating system to send the GPIO command to the virtual GPIO controller driver.

Example 42 includes the subject matter of any of Examples 23-41, and wherein receiving the GPIO command by the virtual GPIO controller driver comprises receiving a callback method from the operating system.

Example 43 includes the subject matter of any of Examples 23-42, and wherein the virtual GPIO controller firmware interface comprises a control method for a virtual machine, the control method to be interpreted by a bytecode interpreter of the computing device.

Example 44 includes the subject matter of any of Examples 23-43, and wherein the virtual GPIO controller firmware interface comprises an advanced configuration and power interface (ACPI) device including a plurality of ACPI control methods.

Example 45 includes a computing device comprising a processor; and a memory having stored therein a plurality of instructions that when executed by the processor cause the computing device to perform the method of any of Examples 23-44.

Example 46 includes one or more machine readable storage media comprising a plurality of instructions stored thereon that in response to being executed result in a computing device performing the method of any of Examples 23-44.

Example 47 includes a computing device comprising means for performing the method of any of Examples 23-44.

Example 48 includes a computing device for emulating general purpose I/O (GPIO), the computing device comprising means for receiving a GPIO command by a virtual GPIO controller driver of an operating system of the computing device, the GPIO command to specify an operation to be implemented by a GPIO pin; means for sending the GPIO command from the virtual GPIO controller driver to a virtual GPIO controller firmware interface of the computing device in response to receiving the GPIO command; means for receiving the GPIO command by the virtual GPIO controller firmware interface from the virtual GPIO controller driver;

and means for emulating, by a virtual GPIO controller of the computing device, a virtual GPIO pin to implement the GPIO command in response to receiving the GPIO command by the virtual GPIO controller firmware interface from the virtual GPIO controller driver.

Example 49 includes the subject matter of Example 48, and wherein the means for receiving the GPIO command comprises means for receiving a read command; the means for emulating the virtual GPIO pin to implement the GPIO command comprises means for determining a virtual input value of the virtual GPIO pin; and the computing device further comprises means for returning the virtual input value from the virtual GPIO controller driver to the operating system in response to emulating the virtual GPIO pin.

Example 50 includes the subject matter of any of Examples 48 and 49, and wherein the means for receiving the GPIO command comprises means for receiving a write command; and the means for emulating the virtual GPIO pin to implement the GPIO command comprises means for determining a virtual output value of the virtual GPIO pin and maintaining the virtual output value on the virtual GPIO pin for a reference time period.

Example 51 includes the subject matter of any of Examples 48-50, and wherein the means for receiving the GPIO command comprises means for receiving a control command; and the means for emulating the virtual GPIO pin to implement the GPIO command comprises means for modifying a state of the virtual GPIO pin as a function of the control command.

Example 52 includes the subject matter of any of Examples 48-51, and further including means for receiving a second GPIO command by the virtual GPIO controller driver, the second GPIO command to specify an operation to be implemented by a second GPIO pin; means for sending the second GPIO command from the virtual GPIO controller driver to the virtual GPIO controller firmware interface; means for receiving the second GPIO command by the virtual GPIO controller firmware interface from the virtual GPIO controller driver; and means for emulating, by the virtual GPIO controller of the computing device, a second virtual GPIO pin to implement the second GPIO command in response to receiving the second GPIO command by the virtual GPIO controller firmware interface from the virtual GPIO controller driver.

Example 53 includes the subject matter of any of Examples 48-52, and wherein the means for emulating the virtual GPIO pin comprises means for emulating the virtual GPIO pin using a microcontroller of the computing device as the virtual GPIO pin.

Example 54 includes the subject matter of any of Examples 48-53, and wherein the emulating the virtual GPIO pin using the microcontroller comprises means for emulating the virtual GPIO pin using an embedded controller of the computing device as the virtual GPIO pin.

Example 55 includes the subject matter of any of Examples 48-54, and wherein the means for emulating the virtual GPIO pin further comprises means for emulating the virtual GPIO pin using a physical GPIO pin of the embedded controller as the virtual GPIO pin.

Example 56 includes the subject matter of any of Examples 48-55, and further including means for emulating, by the virtual GPIO controller of the computing device, a second virtual GPIO pin using the embedded controller of the computing device as the second virtual GPIO pin.

Example 57 includes the subject matter of any of Examples 48-56, and wherein the means for emulating the virtual GPIO pin comprises means for emulating the virtual GPIO pin using an interface to a peripheral device of the computing device as the virtual GPIO pin.

Example 58 includes the subject matter of any of Examples 48-57, and further including means for reserving a memory segment for use by the virtual GPIO controller; wherein the means for emulating the virtual GPIO pin comprises means for emulating the virtual GPIO pin using the reserved memory segment as backing memory.

Example 59 includes the subject matter of any of Examples 48-58, and further including means for receiving a GPIO event by the virtual GPIO controller, the GPIO event related to a state of the virtual GPIO pin; and means for emulating, by the virtual GPIO controller, the virtual GPIO pin to modify the state of the virtual GPIO pin as a function of the GPIO event.

Example 60 includes the subject matter of any of Examples 48-59, and wherein the means for receiving the GPIO event comprises means for receiving an I/O event from a microcontroller of the computing device; and the means for emulating the virtual GPIO pin comprises means for modifying the state of the virtual GPIO pin as a function of the I/O event.

Example 61 includes the subject matter of any of Examples 48-60, and wherein the means for receiving the I/O event comprises means for receiving an I/O event from an embedded controller of the computing device.

Example 62 includes the subject matter of any of Examples 48-61, and further including means for emulating, by the virtual GPIO controller, a second virtual GPIO pin using the embedded controller of the computing device as the second virtual GPIO pin.

Example 63 includes the subject matter of any of Examples 48-62, and wherein the means for receiving the GPIO event comprises means for receiving an I/O event from a peripheral device of the computing device; and the means for emulating the virtual GPIO pin comprises means for modifying the state of the virtual GPIO pin as a function of the I/O event.

Example 64 includes the subject matter of any of Examples 48-63, and further including means for reserving a memory segment for use by the virtual GPIO controller; wherein the means for receiving the GPIO event comprises means for detecting a memory access to the reserved memory segment; and wherein the means for emulating the virtual GPIO pin comprises means for emulating the virtual GPIO pin using the reserved memory segment as backing memory.

Example 65 includes the subject matter of any of Examples 48-64, and further including means for triggering, by the virtual GPIO controller firmware interface, a physical interrupt by an I/O subsystem of the computing device to the operating system in response to modifying the state of the virtual GPIO pin.

Example 66 includes the subject matter of any of Examples 48-65, and wherein the interrupt is to cause the operating system to send the GPIO command to the virtual GPIO controller driver.

Example 67 includes the subject matter of any of Examples 48-66, and wherein the means for receiving the GPIO command by the virtual GPIO controller driver comprises means for receiving a callback method from the operating system.

Example 68 includes the subject matter of any of Examples 48-67, and wherein the virtual GPIO controller firmware interface comprises a control method for a virtual machine, the control method to be interpreted by a bytecode interpreter of the computing device.

Example 69 includes the subject matter of any of Examples 48-68, and wherein the virtual GPIO controller firmware interface comprises an advanced configuration and power interface (ACPI) device including a plurality of ACPI control methods.

The invention claimed is:

1. A computing device for emulating general purpose I/O (GPIO), the computing device comprising a virtual GPIO controller driver, a virtual GPIO controller firmware interface, and a virtual GPIO controller, wherein:
   the virtual GPIO controller firmware interface comprises a programmatic interface established by platform firmware of the computing device;
   the virtual GPIO controller driver is to (i) receive a GPIO command from an operating system of the computing device, the GPIO command to specify an operation to be implemented by a GPIO pin, and (ii) invoke the virtual GPIO controller firmware interface with the GPIO command in response to receipt of the GPIO command;
   the virtual GPIO firmware interface is to receive the GPIO command from the virtual GPIO controller driver in response to invocation of the virtual GPIO firmware interface; and
   the virtual GPIO controller is to emulate a virtual GPIO pin to implement the GPIO command in response to receipt of the GPIO command by the virtual GPIO controller firmware interface from the virtual GPIO controller driver.

2. The computing device of claim 1, wherein:
   the virtual GPIO controller driver is further to (i) receive a second GPIO command the second GPIO command to specify an operation to be implemented by a second GPIO pin, and (ii) invoke the virtual GPIO controller firmware interface with the second GPIO command in response to receipt of the second GPIO command;
   the virtual GPIO controller firmware interface is further to receive the second GPIO command from the virtual GPIO controller driver in response to invocation of the virtual GPIO firmware interface; and
   the virtual GPIO controller is further to emulate a second virtual GPIO pin to implement the second GPIO command in response to receipt of the second GPIO command by the virtual GPIO controller firmware interface from the virtual GPIO controller driver.

3. The computing device of claim 1, wherein to emulate the virtual GPIO pin comprises to emulate the virtual GPIO pin using a microcontroller of the computing device as the virtual GPIO pin.

4. The computing device of claim 3, wherein to emulate the virtual GPIO pin further comprises to emulate the virtual GPIO pin using a physical GPIO pin of the microcontroller as the virtual GPIO pin.

5. The computing device of claim 3, wherein the virtual GPIO controller is further to emulate a second virtual GPIO pin using the microcontroller of the computing device as the second virtual GPIO pin.

6. The computing device of claim 1, wherein to emulate the virtual GPIO pin comprises to emulate the virtual GPIO pin using an interface to a peripheral device of the computing device as the virtual GPIO pin.

7. The computing device of claim 1, wherein the virtual GPIO controller is further to:
   receive a GPIO event, the GPIO event related to a state of the virtual GPIO pin; and
   emulate the virtual GPIO pin to modify the state of the virtual GPIO pin as a function of the GPIO event.

8. The computing device of claim 7, wherein:
   the GPIO event comprises an I/O event received from a microcontroller of the computing device; and
   to emulate the virtual GPIO pin comprises to modify the state of the virtual GPIO pin as a function of the I/O event.

9. The computing device of claim 8, wherein the virtual GPIO controller is further to emulate a second virtual GPIO pin using the microcontroller of the computing device as the second virtual GPIO pin.

10. The computing device of claim 7, wherein the virtual GPIO controller firmware interface is further to trigger a physical interrupt by an I/O subsystem of the computing device to the operating system in response to a modification of the state of the virtual GPIO pin.

11. The computing device of claim 1, wherein:
    the virtual GPIO controller firmware interface comprises: a control method for a virtual machine, the control method to be interpreted by a bytecode interpreter of the computing device, and (ii) an advanced configuration and power interface (ACPI) device that includes a plurality of ACPI control methods; and
    to invoke the virtual GPIO controller firmware interface comprises to invoke the control method.

12. A method for emulating general purpose I/O (GPIO) on a computing device, the method comprising:
    receiving a GPIO command by a virtual GPIO controller driver of an operating system of the computing device, the GPIO command to specify an operation to be implemented by a GPIO pin;
    invoking, by the virtual GPIO controller driver, a virtual GPIO controller firmware interface with the GPIO command in response to receiving the GPIO command wherein the virtual GPIO controller firmware interface comprises a programmatic interface established by platform firmware of the computing device;
    receiving the GPIO command by the virtual GPIO controller firmware interface from the virtual GPIO controller driver in response to invoking the virtual GPIO controller firmware interface; and
    emulating, by a virtual GPIO controller of the computing device, a virtual GPIO pin to implement the GPIO command in response to receiving the GPIO command by the virtual GPIO controller firmware interface from the virtual GPIO controller driver.

13. The method of claim 12, further comprising:
    receiving a second GPIO command by the virtual GPIO controller driver, the second GPIO command to specify an operation to be implemented by a second GPIO pin;
    invoking, by the virtual GPIO controller driver, the virtual GPIO controller firmware interface with the second GPIO command in response to receiving the second GPIO command;
    receiving the second GPIO command by the virtual GPIO controller firmware interface from the virtual GPIO controller driver in response to invoking the virtual GPIO controller firmware interface; and
    emulating, by the virtual GPIO controller of the computing device, a second virtual GPIO pin to implement the second GPIO command in response to receiving the second GPIO command by the virtual GPIO controller firmware interface from the virtual GPIO controller driver.

14. The method of claim 12, wherein emulating the virtual GPIO pin comprises emulating the virtual GPIO pin using a microcontroller of the computing device as the virtual GPIO pin.

15. The method of claim 12, wherein emulating the virtual GPIO pin comprises emulating the virtual GPIO pin using an interface to a peripheral device of the computing device as the virtual GPIO pin.

16. The method of claim 12, further comprising:
receiving a GPIO event by the virtual GPIO controller, the GPIO event related to a state of the virtual GPIO pin; and
emulating, by the virtual GPIO controller, the virtual GPIO pin to modify the state of the virtual GPIO pin as a function of the GPIO event.

17. The method of claim 16, further comprising triggering, by the virtual GPIO controller firmware interface, a physical interrupt by an I/O subsystem of the computing device to the operating system in response to modifying the state of the virtual GPIO pin.

18. The method of claim 12, wherein the virtual GPIO controller firmware interface comprises:
a control method for a virtual machine, the control method to be interpreted by a bytecode interpreter of the computing device; and
an advanced configuration and power interface (ACPI) device including a plurality of ACPI control methods; and
wherein invoking the virtual GPIO controller firmware interface comprises invoking the control method.

19. One or more non-transitory, computer-readable storage media comprising a plurality of instructions that in response to being executed cause a computing device to:
receive a general-purpose I/O (GPIO) command by a virtual GPIO controller driver of an operating system of the computing device, the GPIO command to specify an operation to be implemented by a GPIO pin;
invoke, by the virtual GPIO controller driver, a virtual GPIO controller firmware interface with the GPIO command in response to receiving the GPIO command, wherein the virtual GPIO controller firmware interface comprises a programmatic interface established by platform firmware of the computing device;
receive the GPIO command by the virtual GPIO controller firmware interface from the virtual GPIO controller driver in response to invoking the virtual GPIO controller firmware interface; and
emulate, by a virtual GPIO controller of the computing device, a virtual GPIO pin to implement the GPIO command in response to receiving the GPIO command by the virtual GPIO controller firmware interface from the virtual GPIO controller driver.

20. The one or more non-transitory, computer-readable storage media of claim 19, further comprising a plurality of instructions that in response to being executed cause the computing device to:
receive a second GPIO command by the virtual GPIO controller driver, the second GPIO command to specify an operation to be implemented by a second GPIO pin;
invoke, by the virtual GPIO controller driver, the virtual GPIO controller firmware interface with the second GPIO command in response to receiving the second GPIO command;
receive the second GPIO command by the virtual GPIO controller firmware interface from the virtual GPIO controller driver in response to invoking the virtual GPIO controller firmware interface; and
emulate, by the virtual GPIO controller of the computing device, a second virtual GPIO pin to implement the second GPIO command in response to receiving the second GPIO command by the virtual GPIO controller firmware interface from the virtual GPIO controller driver.

21. The one or more non-transitory, computer-readable storage media of claim 19, wherein to emulate the virtual GPIO pin comprises to emulate the virtual GPIO pin using a microcontroller of the computing device as the virtual GPIO pin.

22. The one or more non-transitory, computer-readable storage media of claim 19, wherein to emulate the virtual GPIO pin comprises to emulate the virtual GPIO pin using an interface to a peripheral device of the computing device as the virtual GPIO pin.

23. The one or more non-transitory, computer-readable storage media of claim 19, further comprising a plurality of instructions that in response to being executed cause the computing device to:
receive a GPIO event by the virtual GPIO controller, the GPIO event related to a state of the virtual GPIO pin; and
emulate, by the virtual GPIO controller, the virtual GPIO pin to modify the state of the virtual GPIO pin as a function of the GPIO event.

24. The one or more non-transitory, computer-readable storage media of claim 23, further comprising a plurality of instructions that in response to being executed cause the computing device to trigger, by the virtual GPIO controller firmware interface, a physical interrupt by an I/O subsystem of the computing device to the operating system in response to a modification of the state of the virtual GPIO pin.

25. The one or more non-transitory, computer-readable storage media of claim 19, wherein the virtual GPIO controller firmware interface comprises:
a control method for a virtual machine, the control method to be interpreted by a bytecode interpreter of the computing device; and
an advanced configuration and power interface (ACPI) device including a plurality of ACPI control methods; and
wherein to invoke the virtual GPIO controller firmware interface comprises to invoke the control method.

* * * * *